United States Patent
Peeters et al.

(10) Patent No.: US 8,031,760 B2
(45) Date of Patent: Oct. 4, 2011

(54) FAST MODEM RECONFIGURATION

(75) Inventors: Miguel Peeters, Woluwe St. Lambert (BE); Raphael Cassiers, Braine-I 'Alleud (BE)

(73) Assignee: Broadcom Corporation, Irvine, CA (US)

( * ) Notice: Subject to any disclaimer, the term of this patent is extended or adjusted under 35 U.S.C. 154(b) by 737 days.

(21) Appl. No.: 12/050,461

(22) Filed: Mar. 18, 2008

(65) Prior Publication Data

US 2008/0260011 A1 Oct. 23, 2008

Related U.S. Application Data

(60) Provisional application No. 60/907,218, filed on Mar. 26, 2007.

(51) Int. Cl.
*H04B 1/38* (2006.01)

(52) U.S. Cl. ..................... 375/222

(58) Field of Classification Search .......... 375/219–227, 375/260; 455/73, 78, 88, 550.1, 557; 379/93.01, 379/93.26, 93.28, 93.29

See application file for complete search history.

(56) References Cited

U.S. PATENT DOCUMENTS

| | | | | |
|---|---|---|---|---|
| 6,307,889 | B1 * | 10/2001 | Chun | 375/260 |
| 6,819,749 | B1 * | 11/2004 | Olafsson et al. | 379/93.32 |
| 7,277,531 | B2 * | 10/2007 | Olafsson et al. | 379/93.32 |
| 2006/0176942 | A1 * | 8/2006 | Oksman et al. | 375/222 |

OTHER PUBLICATIONS

Chen et al., Full-Duplex Fast Initializing Digital Subscriber Loop Echo Cancellers, Feb. 1994, IEEE Transactions on Cicircuits and Systems-II: Analog and Digital Signal Processing, vol. 41, pp. 99-104.*

ITU-T Recommendation G.992.3, Asymmetric Digital Subscriber Line Transceivers 2, Jan. 2005.
ITU-T Recommendation G.992.3, Asymmetric Digital Subscriber Line Transceivers 2, Amendment 1, Sep. 2005.
ITU-T Recommendation G.992.3, Asymmetric Digital Subscriber Line Transceivers 2, Amendment 2, Mar. 2006.
ITU-T Recommendation G.992.3, Asymmetric Digital Subscriber Line Transceivers 2, Amendment 3, Dec. 2006.
ITU-T Recommendation G.993.2, Very High Speed Digital Subscriber Line Transceivers 2, Feb. 2006.
ITU-T Recommendation G.993.2, Very High Speed Digital Subscriber Line Transceivers 2, Corrigendum 1, Dec. 2006.
ITU-T Recommendation G.994.1, Handshake Procedures for Digital Subscriber Line (DSL) Transceivers, Feb. 2007.
ITU-T Recommendation G.994.1, Handshake Procedures for Digital Subscriber Line (DSL) Transceivers, May 2003.
ITU-T Recommendation G.994.1, Handshake Procedures for Digital Subscriber Line (DSL) Transceivers, Amendment 1, Feb. 2004.
ITU-T Recommendation G.994.1, Handshake Procedures for Digital Subscriber Line (DSL) Transceivers, Amendment 2, Jun. 2004.

(Continued)

*Primary Examiner* — Tesfaldet Bocure
*Assistant Examiner* — Lawrence Williams
(74) *Attorney, Agent, or Firm* — Sterne, Kessler, Goldstein & Fox P.L.L.C.

(57) ABSTRACT

Methods, systems, and computer program products for reconfiguring a modem. In an embodiment, fast reconfiguration of a modem occurs when a first modem determines there is a need for fast reconfiguration. The first modem signals its transition from showtime to fast reconfiguration. The first modem waits for acknowledgement from a second modem before transitioning to showtime. Once transitioned from showtime, the first modem estimates a signal to noise ratio and then exchanges parameters with the second modem. The first and second modems then transition to showtime.

48 Claims, 7 Drawing Sheets

OTHER PUBLICATIONS

ITU-T Recommendation G.994.1, Handshake Procedures for Digital Subscriber Line (DSL) Transceivers, Amendment 3, Jan. 2005.

ITU-T Recommendation G.994.1, Handshake Procedures for Digital Subscriber Line (DSL) Transceivers, Amendment 4, Jan. 2006.

G.vdsl: Faster OLR to Avoid retrains caused by XTALK of Adjacent Pair Initialization, Study Group 15, ITU—Telecommunication Standardization Sector, Temporary Document GB-035, Jun. 12, 2006.

* cited by examiner

FAST MODEM RECONFIGURATION

CROSS REFERENCE TO RELATED APPLICATIONS

This application claims benefit of U.S. Provisional Application No. 60/907,218, entitled "A Fast Sequence for Modem Reconfiguration," filed Mar. 26, 2007, which is incorporated by reference herein in its entirety.

BACKGROUND OF THE INVENTION

1. Field of the Invention

Embodiments of the present invention relate to data communication. More specifically, certain embodiments of the invention relate to a method and system for communicating data in xDSL.

2. Background Art

In the field, DSL modems using discrete multitone (DMT) modulations, e.g., Asymmetric Digital Subscriber Line 2 (ADSL2), and Very High Speed Digital Subscriber Line 2 (VDSL2) are typically subject to retrains and/or re-initializations due to sudden variations in noise level. ADSL2 is described in ITU-T Recommendation G.992.3, Asymmetric Digital Subscriber Line Transceivers 2, January 2005, and subsequent Amendments: Amendment 1, September 2005; Amendment 2, March 2006; Amendment 3, December 2006; all of which are incorporated by reference herein in their entireties. VDSL2 is described in ITU-T Recommendation G.993.2, Very High Speed Digital Subscriber Line Transceivers 2, February 2006, and subsequent Corrigenda: Corrigendum 1, December 2006; all of which are incorporated by reference herein in their entireties.

For example, the noise varies in shape and amplitude, lowering the SNR on some tones and causing errors on the link. The modem(s) attempt on line recovery (OLR) procedures (e.g., bit swapping, seamless rate adaptation), but may not recover an error free link for various reasons (e.g., the link is broken in both directions, or the variation would exceed the minimal service requirements such as delay, impulse noise protection (INP), or rate parameters). One modem may essentially give up after a certain length of time, tear down the link, and the modems retrain or reinitialize.

The ADSL2 standard defines a fast initialization sequence to allow the modem to retrain in significantly less time than a normal initialization. This initialization consists in a restart of the modem where the handshake phase is skipped and the duration of the initialization signals are shorter. Handshake procedures are described in ITU-T Recommendation G.994.1, Handshake Procedures For Digital Subscriber Line (DSL) Transceivers, February 2007, and the superseded version of May, 2003 and its Amendments 1-4 (February 2004, June 2004, January 2005, January 2006, respectively); all of which are incorporated by reference herein in their entireties.

During the fast retrain, however, both modems must re-acquire loop timing, retrain equalizers (e.g., time domain and frequency domain equalizers), measure SNRs per tone, and exchange new bit-loading and framing parameters. Fast retrain is not very different than a normal initialization, and thus is not of significantly shorter duration than the normal initialization—except for the deletion of the handshake phase.

What is needed is a system and method to escape steady state (i.e., showtime) and quickly reconfigure or adjust the needed parameters to maintain communication. As used herein, "showtime" is the state of a modem after initialization including training is completed and data (e.g., bearer channel data) is being transferred.

BRIEF SUMMARY OF THE INVENTION

Methods, systems, and computer program products are provided for reconfiguring a modem. In an embodiment, fast reconfiguration of a modem occurs when a first modem determines there is a need for fast reconfiguration. The first modem signals its transition from showtime to fast reconfiguration. In an embodiment, the first modem waits for acknowledgement from a second modem before transitioning to showtime. Once transitioned from showtime, the first modem estimates a signal to noise ratio and then exchanges parameters with the second modem. In an embodiment, the modems then transition to showtime.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers may indicate identical or similar elements. Additionally, the left-most digit(s) of a reference number may identify the drawing in which the reference number first appears.

DETAILED DESCRIPTION OF THE INVENTION

Overview

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be used in a variety of other applications. The scope of the invention is not limited to the disclosed embodiments. The invention is defined by the claims appended hereto.

References to "one embodiment," "an embodiment," "this embodiment," "an example embodiment," etc., indicate that the embodiment described may include a particular feature, structure, or characteristic, but every embodiment might not necessarily include the particular feature, structure or characteristic. Moreover, such phrases are not necessarily referring to the same embodiment. Further, when a particular feature, structure, or characteristic is described in connection with an embodiment, it is understood that it is within the knowledge of one skilled in the art to effect such a feature, structure, or characteristic in connection with other embodiments whether or not explicitly described.

Although embodiments are applicable to any communication system, for brevity and clarity the well-known VDSL2 and ADSL2 environments are used as examples to illustrate various features of the present invention.

Example Environment

Figure 1:
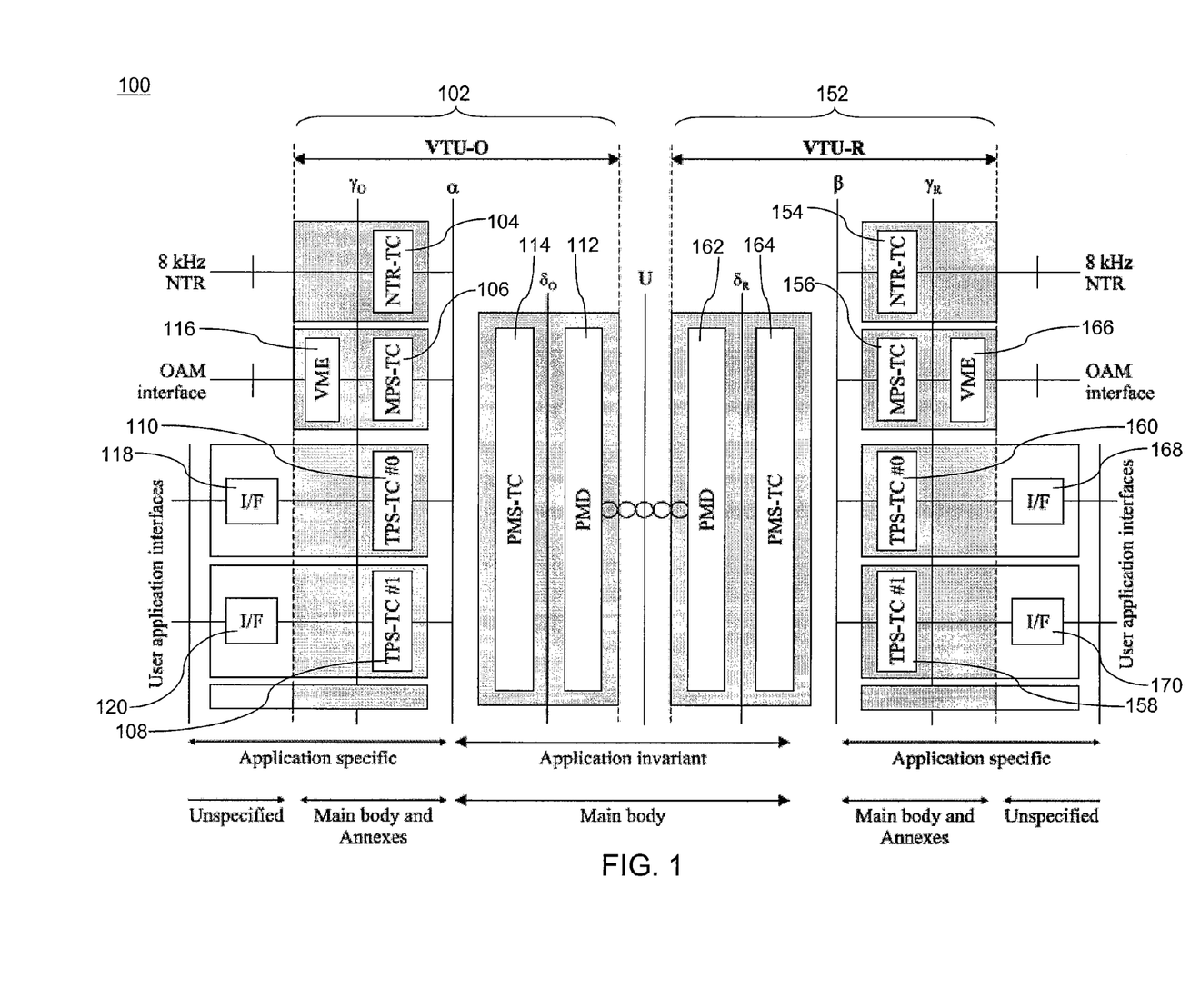
FIG. 1 illustrates an example VDSL2 functional model.

FIG. 1 illustrates the VDSL2 functional model that will be used to describe some embodiments of the invention. The ADSL2 environment is similar, and pertinent differences will be discussed at the time they become important. The environment 100 includes a VDSL2 Transceiver Unit Remote (VTU-R) 152, which is typically located at the subscriber or customer site, and a VDSL2 Transceiver Unit Operator (VTU-O) 102, which is typically centrally located. In ADSL, the equivalent units are the ADSL2 Transceiver Unit Remote (ATU-R) and the ADSL2 Transceiver Unit Central (ATU-C). There may be more than one central and more than one subscriber-side modem.

Each VTU-O 102 and VTU-R 152 includes a Physical Media Dependent sublayer (PMD) 112 and 162, respectively. In the transmit direction, the PMD sub-layer receives input data frames from the PMS-TC sub-layer. Each data frame contains an integer number of data bits to be modulated onto one discrete multitone (DMT) symbol. Prior to modulation, the incoming bits are encoded into symbols, and the incoming bit stream is divided into small groups of bits. Each group is assigned to modulate a specific sub-carrier of the DMT signal. Each group is further encoded by a trellis encoder and mapped to a point in a signal constellation. The set of constellation points modulates the sub-carriers of the DMT symbol using an inverse discrete Fourier transform (IDFT). The number of bits assigned to each sub-carrier is determined during the initialization procedure based on the signal to noise ratio (SNR) of the sub-carrier and specific system configuration settings. After the IDFT, the resulting symbol is cyclically extended and windowed, and sent towards the transmission medium over the U interface.

In the receive direction, the signal incoming from the transmission medium via the U interface is demodulated and decoded to extract the transmitted data frame. The data frame obtained from a decoder, and the data frame output is sent to the PMS-TC sub-layer.

Each VTU also includes a Physical Media Specific Transmission Convergence sublayer (PMS-TC) 114 and 164. Each PMS-TC 114 and 164 provides transmission medium specific TC functions, such as scrambling, framing, forward error correction (FEC), and interleaving. PMS-TCs 114 and 164 accepts incoming data in a uniform format including up to two bearer channels of transmit user data originated by one or more user data Transmission Protocol Specific TC sublayers (TPS-TCs) 108, 110, 158, and 160; management data originated by Management Protocol Specific TC (MPS-TC) sublayers 106 and 156; and Network Timing Reference (NTR) sublayers 104 and 154. The incoming user data and the overhead data are multiplexed into one or two latency paths. Each bearer channel is carried over a single latency path. A syncbyte is added to each latency path for overhead (OH) frame alignment. The multiplexed data in each latency path is scrambled, encoded using Reed-Solomon forward error correction coding, and interleaved. Interleaved buffers of data of both latency paths are multiplexed into a bit stream to be submitted to PMD sublayer 112 and 162.

The TPS-TC layers of VTU 102 and 152 reside between the γ reference point and the α/β reference point as illustrated in the functional model shown in FIG. 1. The α and β reference points define corresponding interfaces between TPS-TC layer and PMS-TC 114 and 164 at the VTU-O 102 and VTU-R 152 sides respectively. Both interfaces are logical and application independent. The interfaces comprise the data flow; synchronization flow; and control flow of hypothetical signals between the TPS-TC layer and PMS-TCs 114 and 164.

The TPS-TC layer contains one or more user data TPS-TC sublayers 108, 110, 158, and 160 that provide transport of user data using different transport protocols; management TPS-TC (MPS-TC) sublayers 106 and 156 providing embedded operation channel (eoc) transport over the VDSL2 link; and network timing reference TC (NTR-TCs) sublayers 104 and 154 providing transport of a network timing reference. User data TPS-TC 108, 110, 158, and 160 operates over a separate bearer channel, where PMS-TCs 114 and 164 allocate these bearer channels to latency paths.

User data TPS-TCs 108, 110, 158, and 160 support different types of user data including synchronous transfer mode, asynchronous transfer mode, and Ethernet/generic packet transport via interfaces 118, 120, 168, and 170. Each data type is defined as an application option. VTU-O 102 selects the user data type for each bearer channel, both upstream and downstream, based on the type of higher layer data it chooses to support on that bearer channel. The enabled user data type for each of the bearer channels is indicated during initialization.

VTUs 102 and 152 each have a Management Protocol Specific TC sublayers (MPS-TC) 106 and 156 to support management data transport. MPS-TCs 106 and 156 facilitate transport of eoc data between VDSL2 management entities (VMEs) 116 and 166. In the transmit direction, MPS-TC 106 or 156 gets an eoc message from VME 116 or 166, and encapsulates it using a High-Level Data Link Control frame format, and submits it to be transported using a PMS-TC 114 or 164 overhead messaging channel. In the receive direction, MPS-TC 106 or 156 delineates HDLC frames, runs frame check sequence verifications, and extracts encapsulated eoc messages from correctly received HDLC frames. Received eoc messages are submitted to VME 116 or 166.

VMEs 116 and 166 support management data communication protocols. VMEs 116 and 166 provide necessary management functions to communicate with the Management Information Base (MIB) and with the Network Management System (NMS) via the External OAM Interface Adapter (EIA). VMEs 116 and 166 also manage the Operations, Administration and Maintenance (OAM) communication channels, and support all internal management functions of VTUs 102 and 152, including: performance monitoring, performance management, configuration management, and fault management. VMEs 116 and 166 also provide functionality to communicate the management data between VTU-O 102 and VTU-R 152. Specifically, VME 116 and 166 originate eoc messages and IB to communicate management data, assign priority levels for eoc messages to share the overhead messaging channel, and maintain the protocol of eoc message exchange (re-send messages, abandon certain tasks, etc.).

Example Initialization

Initialization of a VTU-O 102 with a VTU-R 152 includes the following main tasks: definition of a common mode of operation (profile, band plan and initial values of basic modulation parameters); synchronization (sample clock alignment and symbol alignment); transfer from the VTU-O to the VTU-R of transmission parameters, including information on the Power Spectral Density (PSD) masks to be used, RFI bands (e.g., amateur radio bands) to be protected, and target data rates in both transmission directions; channel identification; noise identification; calculation of framer, interleaver, and coding parameters and the bit loading and gain tables; and exchange of modem parameters including RS settings, interleaver parameters, framer settings, bit loading and gain tables.

Figure 2:
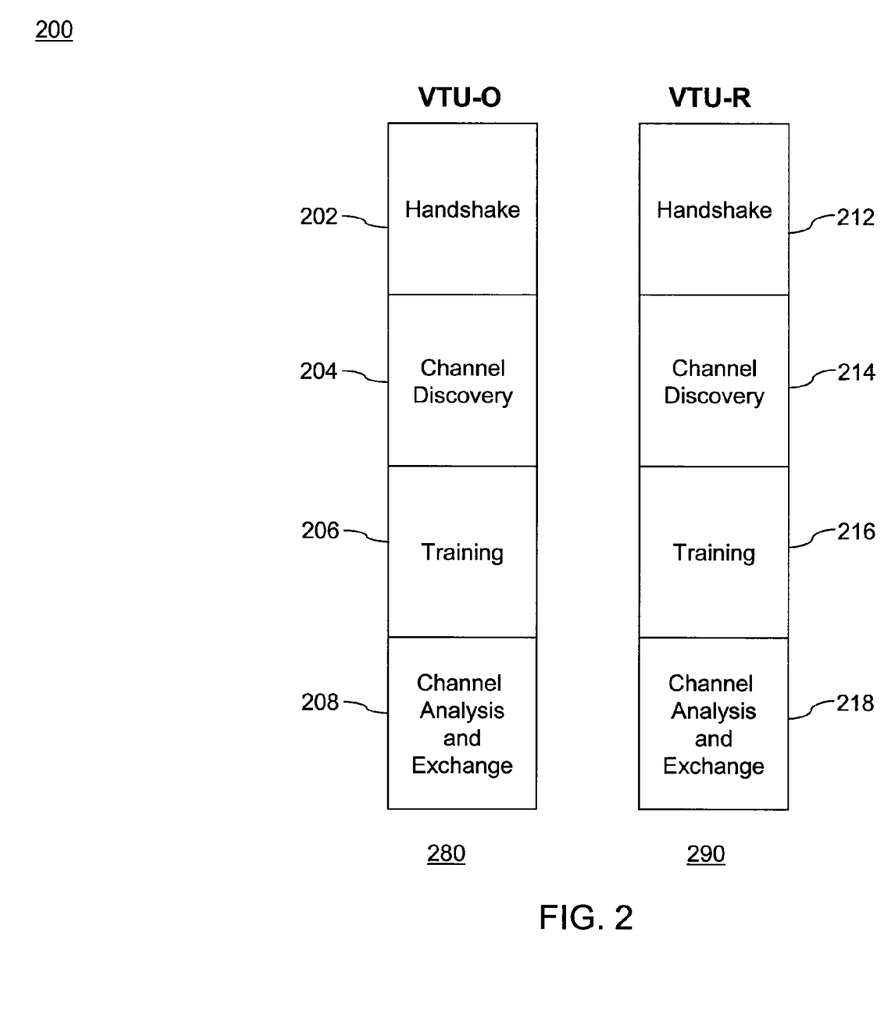
FIG. 2 shows an example initialization timeline.

FIG. 2 illustrates an example initialization time line 200. Time line 200 contains four phases illustrated in column 280 and column 290 for a VTU-O 102 and a VTU-R 152 respectively. First, a handshake phase 202 and 212 in accordance with G.994.1 is performed. Next, upstream power back-off is applied and a full duplex link between VTU-O 102 and the VTU-R 152 is established during the channel discovery phase 204 and 214 to set the Power Spectral Densities (PSDs) of the transmit signals and the main modulation parameters. During the training phase 206 and 216, any existing time-domain equalizers (TEQs) and echo cancellers may be trained, and the timing advance is refined. During the channel analysis & exchange phase 208 and 218, the two modems shall measure the characteristics of the channel and exchange parameters to be used in showtime.

Example on Line Reconfiguration and Fast Initialization

On Line Reconfiguration (OLR) of PMDs 112 and 162 provides a means for adapting to slowly varying channel conditions. OLR procedures provide transparency to the higher layers by providing means for configuration parameter changes without introducing transport errors, latency changes, and interruptions of service.

Three example forms of OLR are Bit Swapping (BS), Dynamic Rate Repartitioning (DRR) and Seamless Rate Adaptation (SRA). Bit Swapping (BS) reallocates data and power (i.e., margin) among the allowed subcarriers without modification of the higher layer features of the physical layer. BS reconfigures the bits and fine gain (bi, gi) parameters without changing any other PMD or PMS-TC control parameters. After a bit swapping reconfiguration the total data rate is unchanged and the data rate on each latency path is unchanged. Bit swapping may be used for autonomous changes to maintain the operating conditions for the modem during changing environment conditions.

Dynamic Rate Repartitioning (DRR) reconfigures the data rate allocation between multiple latency paths by modifying the frame multiplexor control parameters. DRR may also include modifications to the bits and fine gain (bi, gi) parameters, reallocating bits among the subcarriers. DRR does not modify the total data rate but does modify the individual latency path data rates. DRR can include a change in the number of octets per frame bearer per Mux Data Frame. DRR is used in response to higher layer commands and is considered DRR is an application option. The ability to support DRR may be identified during the initialization procedure.

Seamless Rate Adaptation (SRA) reconfigures the total data rate by modifying the frame multiplexor control parameters and modifying the bits and fine gains (bi, gi) parameters. Since the total data rate is modified, at least one latency path will have a new data rate after SRA. The number of frame bearer octets per Mux Data Frame can also be modified in SRA transactions. Because SRA is used in response to higher layer commands, SRA is an application option. The ability to support SRA may be identified during the initialization procedure.

Figure 3:
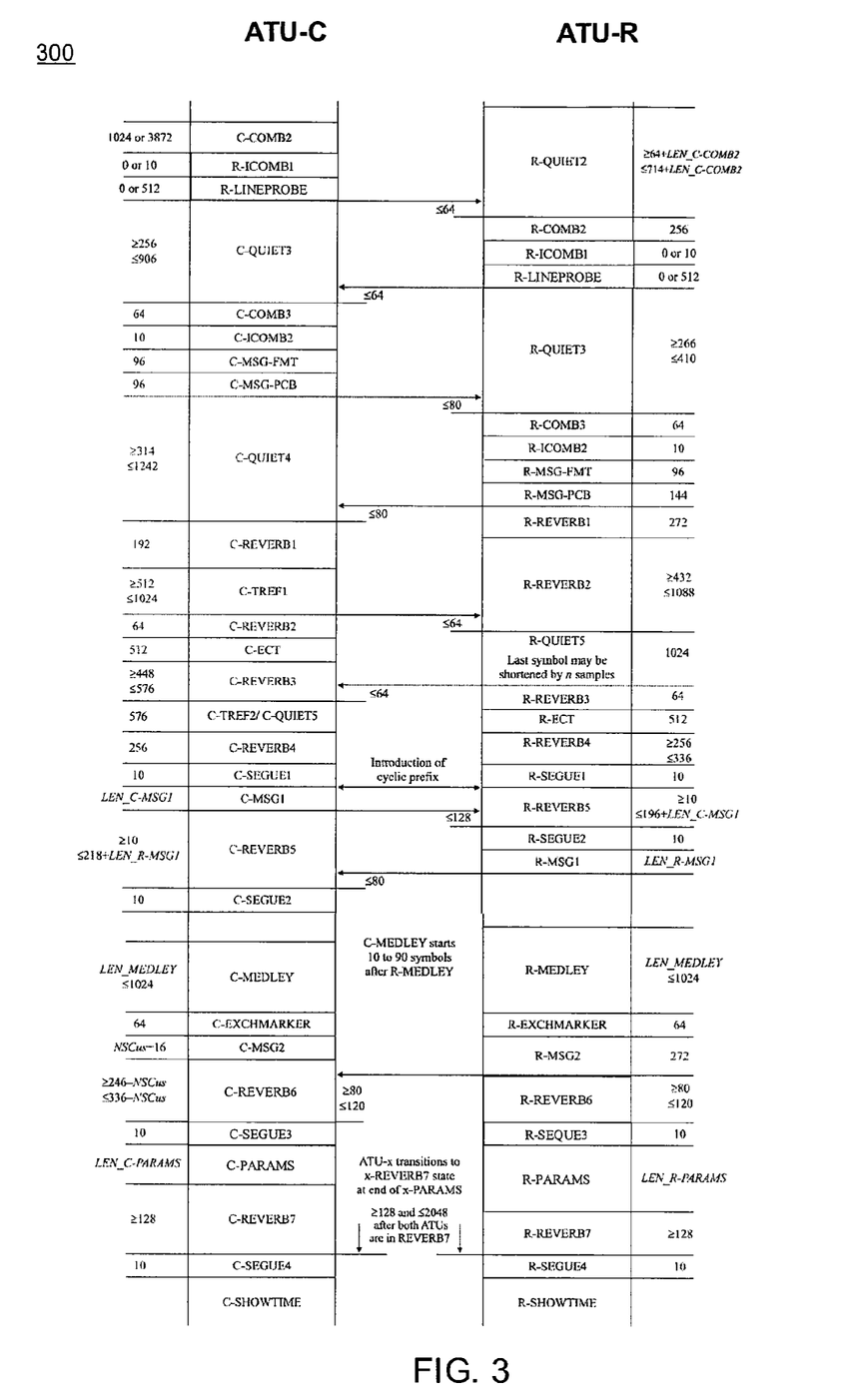
FIG. 3 shows a timing diagram for an example fast initialization procedure for an example system.

Changing line conditions may warrant a fast initialization. A fast initialization is a full initialization as described elsewhere herein, with handshaking 202 and 212 omitted. Fast initialization may be initiated by either VTU 102 or 152, and may be signaled by a specific symbol. A timing diagram for an example fast initialization procedure for an example system (a ADSL2 transceiver pair as defined by G.992.3) is illustrated in FIG. 3. A fast initialization may be initiated by either the central (e.g., ATU-C) or the remote (ATU-R) transceiver.

Fast Reconfiguration

In some circumstances, an OLR may be insufficient or inefficient to address SNR degradation, but fast initialization is not required or simply takes too much time. A Fast Reconfiguration procedure that enables a rapid modification of the bits and gains per tone and framer settings may be used. A fast reconfiguration may be desirable when a modem (e.g., a VTU, ATU, etc.) detects a sudden variation of SNR per tone which causes errors on the link. An example of an indication that the OLR mechanisms do not work is when the other modem does not respond to requests for or after OLR. These are simple examples, a person of skill in the art may identify other situations where a fast reconfiguration is necessary.

Figure 4:
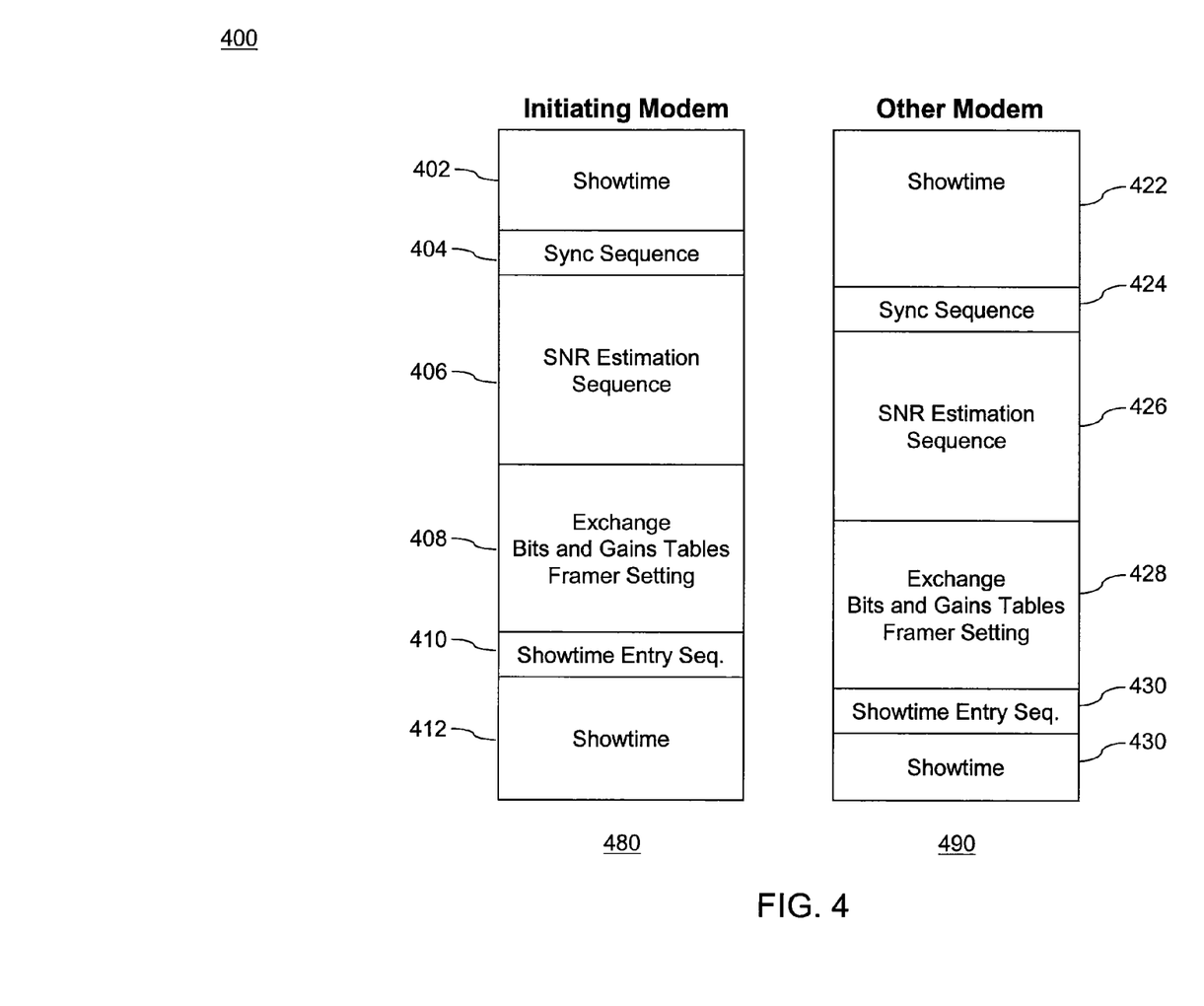
FIG. 4 shows timeline 400, illustrating an example fast reconfiguration for an example initiating modem and another example modem according to embodiments of the invention.

FIG. 4 illustrates a timing diagram 400 of an example fast reconfiguration. Columns 480 and 490 show the timing for the initiating and the other modem respectively. This example begins with both modems in showtime; however, fast reconfiguration may be desirable at other times, depending on the communications system incorporating an embodiment of the invention. This example illustrates the specific messages used for a G993.2 compliant system. Other systems, current and future, would use different messages to accomplish similar results.

Both modems are initially in showtime 402 and 422 respectively. Showtime is the state of a modem after initialization including training is completed and data (e.g., bearer channel data) is being transferred. Upon determining a fast reconfiguration is desirable, the initiating modem sends a synchronization sequence during Sync Sequence 404. Note that either the central modem (e.g., VTU-O, ATU-C, etc.) or a remote modem (e.g., VTU-R, ATU-C, etc.) may be the initializing modem.

A synchronization sequence is a specific sequence of DMT symbols. For example, a synchronization sequence may be a modified Sync Symbol, a modified Sync Symbol followed by QUIET symbols, or a different DMT symbol(s). The initiating modem has escaped showtime: it is no longer transmitting bearer channel data. After some finite amount of time, the other modem enters Sync Sequence 424, and also generates a specific sequence of DMT symbols to indicate that it has transitioned from showtime.

The synchronization DMT symbols have the same symbol timing as showtime symbols, i.e., the beginning of the DMT symbols are aligned with the showtime ones and have the same symbol duration. In other words, the synchronization symbols include the same cyclic prefix, suffix and transmit window length as the showtime symbols. In an embodiment, the DMT symbol alignment for symbols transmitted by the initiating modem is the same from the initial showtime 402 to new showtime 412. In a further embodiment, the DMT symbol alignment is the same for symbols transmitted by the other modem from showtime 422 to new showtime 430. The PSD of the synchronization symbols must be well defined and known to the receiving modem. For example, the PSD may be identical to the PSD of the DMT symbols sent during the analysis and exchange phase of the previous initialization (i.e., all gains set to 1).

In the next phase, SNR estimation sequence 406 and 426, the initiating modem and other modem send symbols and estimate the SNR per tone. They may also perform some training of any equalizers. For example, ADSL2 modems may enter MEDLEY as defined in G.992.3 and VDSL2 modems may send O- and R-P-MEDLEY as defined in G.993.2.

Next, the modems enter their respective exchange sequences 408 and 428. The modems exchange new bits and gains tables and framer setting carried by DMT symbols. For example, ADSL2 modems may enter C- and R-PARAMS states and send the appropriate messages (as described in G.992.3) and VDSL2 modems may send O- and R-PMS and O- and R-PMD messages.

After this exchange, the modems send a set of DMT symbols during showtime entry sequences 410 and 430 to indicate a transition back to showtime 412 and 432 with the new bits and gains tables and framer settings. For example, ADSL2 modems may send REVERB and SEGUE in G.992.3, and VDSL2 modems may send O- and R-P-Synchro in G.993.2.

Because this new sequence is functionally similar to the analysis and exchange phase of the normal initialization of G.992.3 or G993.2, similar signals and messages may be used to estimate SNR and exchange parameters, thus simplifying implementation.

Figure 5:
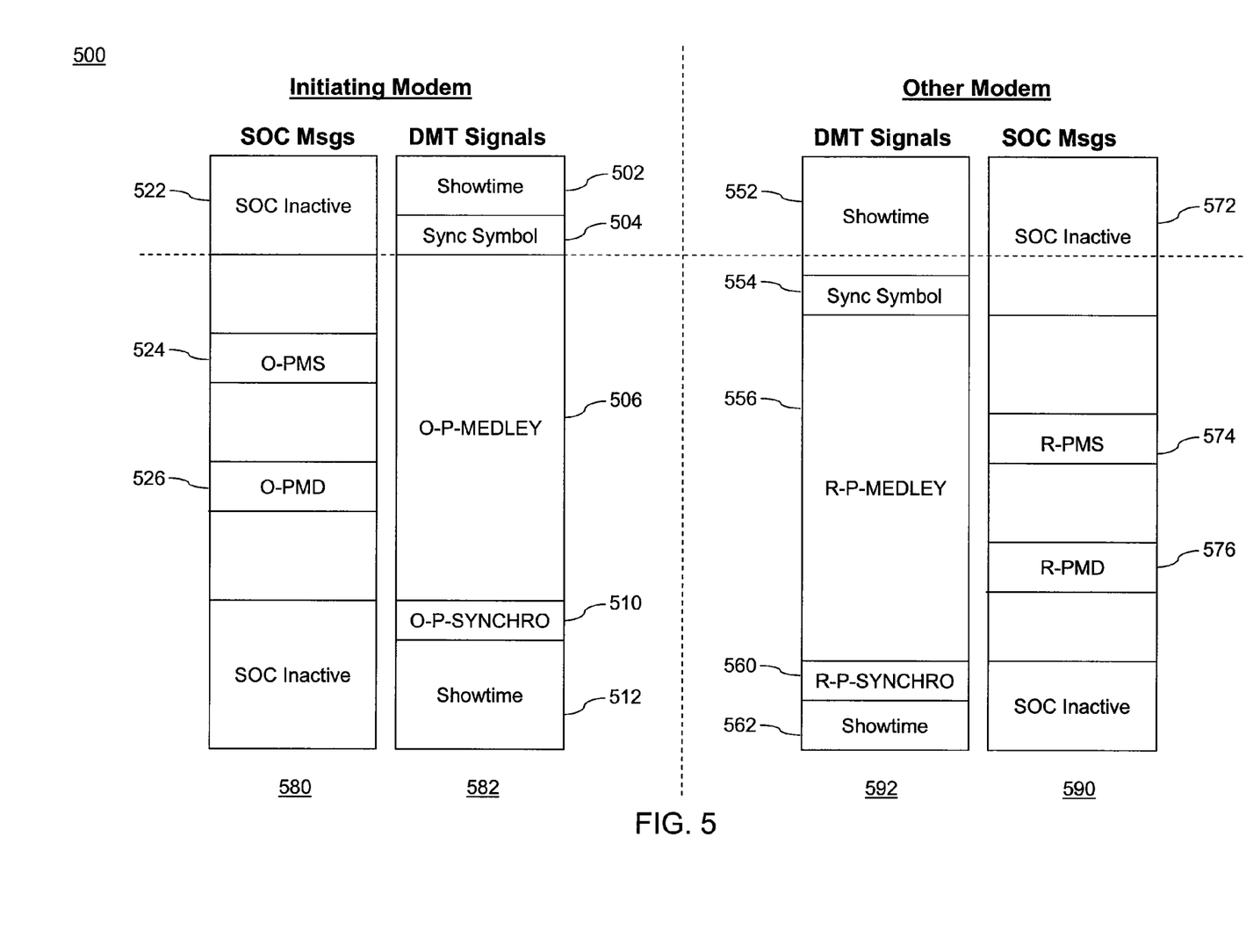
FIG. 5 shows timing diagram 500, illustrating an example fast reconfiguration sequence for an example initiating modem and another example modem according to embodiments of the invention.

FIG. 5 illustrates timing diagram 500 for the initiating modem and the other modem during an example fast reconfiguration sequence. This example uses VDSL2 (i.e., G.993.2) modems, but the principles are equally applicable to other current and future communications systems, including ADSL2 systems.

The two inner columns 582 and 592 show the sequences of signals that are transmitted from the initiating and the other modem respectively. The two outer columns 580 and 590 show the messages that are sent over the SOC by the initiating and other modem respectively.

In this example, the initiating modem is VTU-O 102 and the other modem is VTU-R 152, however, either VTU-R 152 or VTU-O 102 may initiate fast reconfiguration. Both modems are initially in showtime as shown by blocks 502 and 552 respectively, and both special operations channels (SOCs) are inactive as shown by blocks 572 and 522. Upon determining a fast reconfiguration is desirable, the initiating modem sends a synchronization sequence during Sync Symbol 504. The synchronization sequence may be a sync symbol, another specific sequence of DMT symbols, or any other method of signaling. The initiating modem has escaped showtime 502: it is no longer transmitting bearer channel data. After some finite amount of time, the other modem enters Sync Symbol 554, and also generates a synchronization sequence to indicate that it has transitioned from showtime 552.

The O-PMS message sent during block 524 conveys the initial PMS-TC parameter settings that will be used in the upstream direction during the next showtime 512. It also specifies the portion of shared interleaver memory that VTU-R can use to de-interleave the downstream data stream. O-PMS is fully described in section 12.3.5.2.1.3 of G.993.2.

The O-PMD message sent during block 526 conveys the initial PMD parameter settings that will be used in the upstream direction during the next showtime 512. O-PMD is fully described in section 12.3.5.2.1.4 of G.993.2.

The R-PMS message sent during block 574 conveys the initial PMS-TC parameter settings that will be used in the downstream direction during the next showtime 562. R-PMS is fully described in section 12.3.5.2.2.3 of G.993.2.

The R-PMD message sent during block 576 conveys the initial PMD parameter settings that shall be used in the downstream direction during the next showtime 562. R-PMD is fully described in section 12.3.5.2.2.4 of G.993.2.

O-P-MEDLEY sent during block 506 is used by VTU-R 152 to estimate the downstream SNR and to communicate the SOC messages O-PMS and O-PMD. During transmission of O-P-MEDLEY, the SOC is in an active state. The duration of O-P-MEDLEY is variable. The VTU-O terminates O-P-MEDLEY by transmitting O-P-SYNCHRO 6. O-P-MEDLEY is fully described in section 12.3.5.3.1.1 of G.993.2.

O-P-SYNCHRO 6 is sent during block 510, and provides an exact time marker for the transition from O-P-MEDLEY to the next showtime 512. During transmission of O-P-SYNCHRO 6, the SOC is in its inactive state. The duration of O-P-SYNCHRO 6 is 15 DMT symbols. O-P-SYNCHRO 6 is fully described in section 12.3.5.3.1.2 of G.993.2.

R-P-MEDLEY is sent during block 556, and is used by the VTU-O to estimate the upstream SNR and to communicate the SOC messages R-PMS and R-PMD. During transmission of R-P-MEDLEY, the SOC is in an active state. The duration of R-P-MEDLEY is variable. The VTU-R terminates R-P-MEDLEY by transmitting R-P-SYNCHRO 6. R-P-MEDLEY is fully described in section 12.3.5.3.2.1 of G.993.2.

R-P-SYNCHRO 6 is sent during block 560 and provides an exact time marker for the transition from R-P-MEDLEY to the next showtime 562. During transmission of R-P-SYNCHRO 6, the SOC is in an inactive state. The duration of R-P-SYNCHRO 6 is 15 DMT symbols. R-P-SYNCHRO is fully described in section 12.3.5.3.2.2 of G.993.2.

An embodiment of the invention implemented in the G.992.3 ADSL2 framework would be similar, and the ATUs would transmit and be in the REVERB, SEQUE, MEDLEY, EXCHMARKER and PARAMS symbols and states as described in G.992.3.

Example Method

Figure 6:
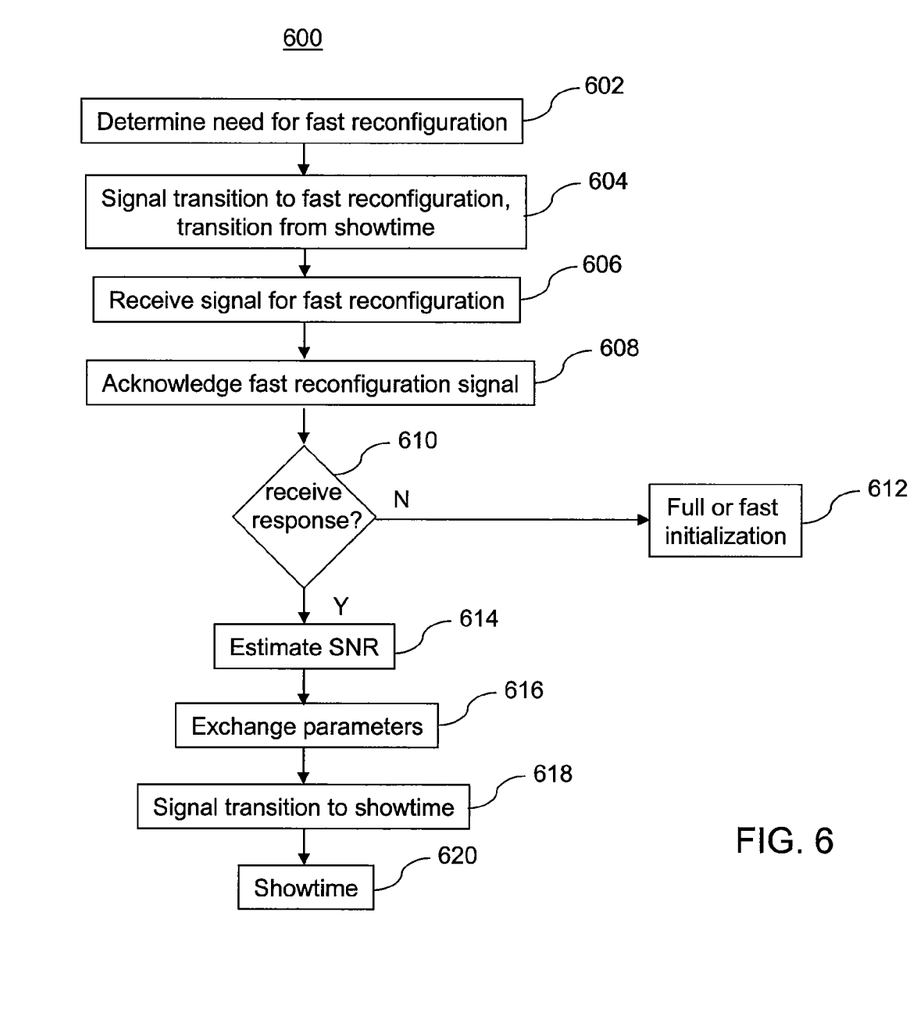
FIG. 6 shows flowchart 600, illustrating exemplary methods of fast reconfiguration according to embodiments of the invention.

FIG. 6 shows flowchart 600 illustrating an example embodiment of a fast reconfiguration. The steps may be performed in any order or concurrently unless specified otherwise. Some embodiments of the present invention do not require the performance of each and every step.

In step 602, a need for fast reconfiguration is determined. The need may be for any reason. For example, a fast configuration may be desirable when a modem (e.g., a VTU, ATU, etc.) detects a sudden variation in SNR. The sudden variation of SNR may cause errors on the link. Also, if OLR is ineffective, a fast reconfiguration may be desirable. Other reasons for fast configuration are apparent to a person of ordinary skill in the art.

In step 604, a transition to fast reconfiguration is signaled. The initiating modem may signal the transition in any way. For example, the initiating modem may send a specific sequence of DMT symbols to indicate the transition, such as a modified sync symbol or a modified sync symbol followed by a QUIET symbol. The modem transitions from showtime in this step.

In step 606, a signal for fast reconfiguration is received by another modem.

In step 608, a fast reconfiguration signal is acknowledged by the modem. For example, the modem receiving the fast reconfiguration signal may transmit a specific sequence of DMT symbols.

In decision step 610, whether a response was received is determined by the initiating modem. If the initiating modem received an acknowledgement of receipt of its fast reconfiguration signal, control proceeds to step 614. If not, then control proceeds to step 612.

In step 612, an initialization, either full or fast, is performed. This step may be reached, for example, if SNR degraded to the point that the modems are unable to communicate. In this case, the initiating modem may attempt a full initialization. For systems with a fast initialization (e.g., G.992.3), a fast initialization may be performed.

In step 614, an SNR is estimated. The SNR may be estimated by any means. In an embodiment, the SNR is estimated for a tone by an exchange of symbols such as in MEDLEY in G.992.3 or O/R-P-MEDLEY in G.993.2.

In step 616, parameters are exchanged. The modems may exchange parameters by any means. In an embodiment, a modem sends DMT symbols carrying new parameters. The new parameters describe the new modem parameters; for example, new bits and gains tables and framer settings. In an embodiment, the new parameters are exchanged in C/R-PARAMS states (as defined in G.992.3). In another embodiment, new parameters are exchanged in O/R-PMS and O/R-PMD (as defined in G.993.2).

In step 618, transition to showtime is signaled. A modem may signal transition to showtime in any way. For example, a modem may send a specific sequence of DMT symbols (e.g., REVERB/SEGUE in G.992.3, O/R-P-SYNCHRO in G.993.2, etc.).

In step 620, a showtime state is entered.

The sending modem in the above steps sends DMT symbols with the same symbol timing as the showtime symbols; that is, the beginning of these DMT symbols are aligned with the showtime ones, and have the same symbol duration as the showtime symbols. Other words, these DMT symbols have the same cyclic prefix, suffix, and transmit window length as the showtime symbols. The power spectral density (PSD) of these DMT symbols used is known by the receiving modem. For example, the PSD may be identical to the PSD of the DMT symbols sent during the analysis and exchange phase of the previous initialization.

Various aspects of the present invention can be implemented by software, firmware, hardware, or a combination thereof. Calculations may be approximated using table lookups. Hardware implementations of individual components are not limited to digital implementations and may be analog electrical circuits. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited.

Figure 7:
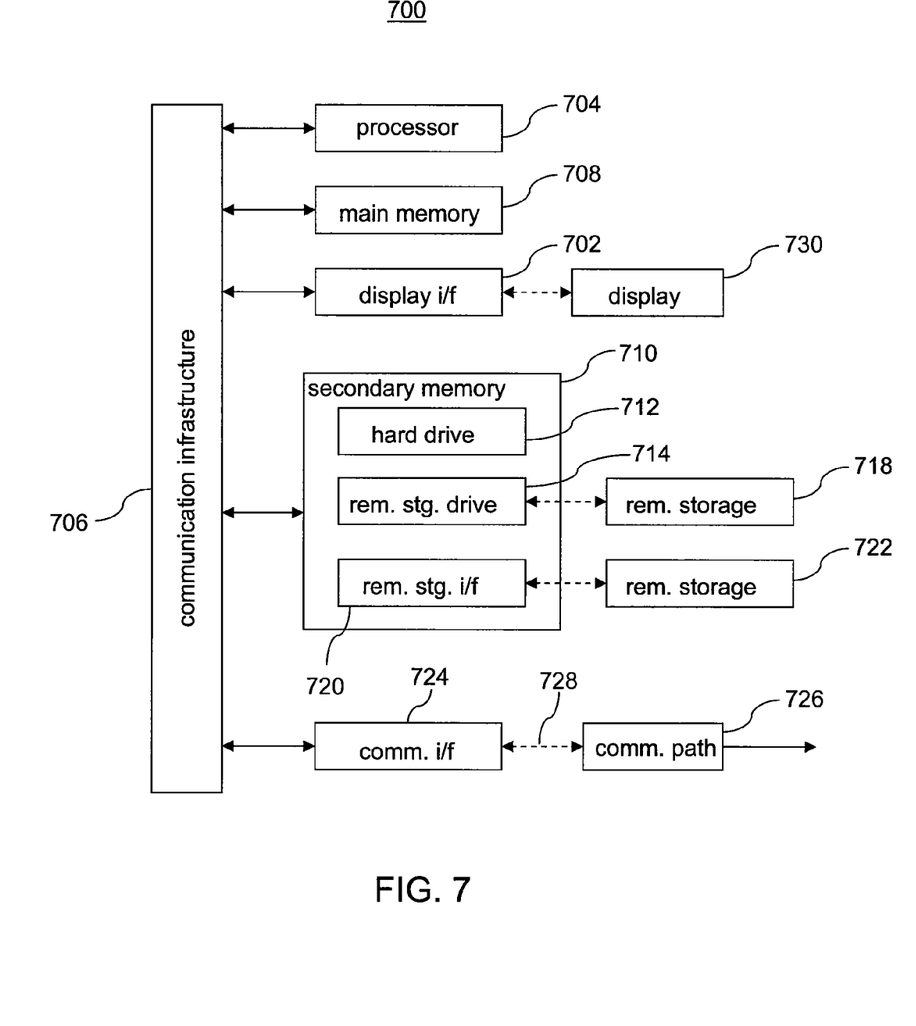
FIG. 7 shows an example computer system in which embodiments of the present invention may be implemented.

FIG. 7 illustrates an example computer system 700 in which the present invention, or portions thereof, can be implemented as computer-readable code. For example, the methods illustrated by flowchart 600 of FIG. 6 can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, any type of non-volatile memory, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. In an embodiment, communications path 724 includes the U interface, as illustrated by FIG. 1, and communications interface includes at least on component of a VTU-O 102 or a VTU-R 152. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals stored elsewhere and carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowcharts 600 of FIG. 6 discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Computer programs or software in the present context means any expression, in any language, code or notation, of a set of instructions intended to cause a system having an information processing capability to perform a particular function either directly or after either or both of the following: a) conversion to another language, code or notation; b) reproduction in a different material form. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

SUMMARY

The above described embodiments may be realized in hardware, software, or most commonly a combination thereof. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

Alternatively, the above described embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reconfiguring a modem, comprising:
   (a) while in a first showtime, determining a need for fast reconfiguration;
   (b) signaling a transition of a first modem from the first showtime to fast reconfiguration, comprising sending at least one discrete multitone (DMT) symbol, wherein an alignment of the at least one sent DMT symbol is maintained from the first showtime;
   (c) transitioning the first modem out of the first showtime;
   (d) estimating a signal to noise ratio (SNR); and
   (e) exchanging parameters based on the estimated SNR with a second modem.

2. The method of claim 1, further comprising:
   (f) receiving at the second modem the signal sent in step (b).
   (g) transitioning the second modem out of a first showtime.

3. The method of claim 1, further comprising:
   (h) transitioning the first modem into a second showtime.

4. The method of claim 1, further comprising:
   (i) transitioning the second modem into a second showtime.

5. The method of claim 1, wherein (a) further comprises:
   (1) detecting a burst of errors.

6. The method of claim 1, wherein (a) further comprises:
   (1) detecting an decrease in SNR.

7. The method of claim 1, wherein (a) further comprises:
   (1) attempting on line recovery (OLR) unsuccessfully.

8. The method of claim 1, wherein (a) further comprises:
   (1) determining that the second modem is not responding to requests.

9. The method of claim 1, wherein (b) further comprises:
   (1) sending a modified sync symbol from the first modem.

10. The method of claim 1, wherein (b) further comprises:
    (1) sending from the first modem a sequence of DMT symbols comprising a modified sync symbol followed by a QUIET symbol.

11. The method of claim 1, wherein (d) further comprises:
    (1) sending at least one DMT symbol, wherein the alignment of the at least one sent DMT symbol is maintained from the first showtime.

12. The method of claim 1, wherein (e) further comprises:
    (1) sending at least one DMT symbol, wherein the alignment of the at least one sent DMT symbol is maintained from the first showtime.

13. The method of claim 3, wherein (h) further comprises:
    (1) sending at least one DMT symbol, wherein the alignment of the at least one sent DMT symbol is maintained from the first showtime.

14. The method of claim 1, wherein step (b) further comprises:
    (1) sending a signal;
    (2) waiting for an acknowledgement; and
    (3) after receiving acknowledgement, proceeding to step (c).

15. The method of claim 14, wherein step (b) further comprises:
    (4) if no acknowledgement is received after a finite amount of time, reinitializing the first modem.

16. The method of claim 1, wherein step (d) further comprises:
    (1) entering a C-Medley state.

17. The method of claim 1, wherein (d) further comprises:
    (1) entering a R-Medley state.

18. The method of claim 1, wherein (d) further comprises:
    (1) sending an O-P-Medley signal.

19. The method of claim 1, wherein (d) further comprises:
(1) sending a R-P-Medley signal.
20. The method of claim 1, wherein (e) further comprises:
(1) entering a C-Params state.
21. The method of claim 1, wherein (e) further comprises:
(1) entering a R-Params state.
22. The method of claim 1, wherein (e) further comprises:
(1) sending an O-PMS message and an O-PMD message.
23. The method of claim 1, wherein (e) further comprises:
(1) sending a R-PMS message and an R-PMD message.
24. A method for reconfiguring a first modem, comprising:
(a) while in a first showtime, receiving a signal of a transition of a second modem from a first showtime to fast reconfiguration;
(b) acknowledging receipt of the signal, comprising sending at least one discrete multitone (DMT) symbol, wherein an alignment of the at least one sent DMT symbol is maintained from the first showtime;
(c) transitioning the first modem out of the first showtime;
(d) estimating a signal to noise ratio (SNR); and
(e) exchanging parameters with the second modem.
25. The method of claim 24, further comprising:
(f) transitioning the first modem into a second showtime.
26. The method of claim 24, further comprising:
(f) transitioning the second modem into a second showtime.
27. The method of claim 24, wherein (d) further comprises:
(1) sending at least one DMT symbol, wherein the alignment of the at least one sent DMT symbol is maintained from the first showtime.
28. The method of claim 24, wherein (e) further comprises:
(1) sending at least one DMT symbol, wherein the alignment of the at least one sent DMT symbol is maintained from the first showtime.
29. The method of claim 24, wherein step (d) further comprises:
(1) entering a C-Medley state.
30. The method of claim 24, wherein (d) further comprises:
(1) entering a R-Medley state.
31. The method of claim 24, wherein (d) further comprises:
(1) sending an O-P-Medley signal.
32. The method of claim 24, wherein (d) further comprises:
(1) sending a R-P-Medley signal.
33. The method of claim 24, wherein (e) further comprises:
(1) entering a C-Params state.
34. The method of claim 24, wherein (e) further comprises:
(1) entering a R-Params state.
35. The method of claim 24, wherein (e) further comprises:
(1) sending an O-PMS message and an O-PMD message.
36. The method of claim 24, wherein (e) further comprises:
(1) sending a R-PMS message and an R-PMD message.
37. A computer program product comprising a non-transitory computer usable medium having computer program logic recorded thereon for enabling a modem to reconfigure, the computer program logic:
enabling a processor to determine a need for fast reconfiguration;
enabling a processor to signal a transition of a first modem from a first showtime to fast reconfiguration, wherein the signaling comprises sending at least one discrete multitone (DMT) symbol, wherein an alignment of the at least one sent DMT symbol is maintained from the first showtime;
enabling a processor to transition the first modem out of the first showtime;
enabling a processor to estimate a signal to noise ratio (SNR); and
enabling a processor to exchange parameters with a second modem.
38. The computer program product of claim 37, wherein the computer program logic further comprises:
enabling a processor to transition the first modem into a second showtime.
39. The computer program product of claim 37, wherein the computer program logic further comprises enabling a processor to send from the first modem a sequence of DMT symbols comprising at least one DMT symbol, wherein the alignment of the at least one sent DMT symbol is maintained from the first showtime.
40. The computer program product of claim 37, wherein the computer program logic further comprises enabling a processor to send from the first modem a sequence of DMT symbols comprising at least one DMT symbol, wherein the alignment of the at least one sent DMT symbol is maintained from the first showtime.
41. The computer program product of claim 37, wherein the computer program logic further comprises enabling a processor to detect a burst of errors.
42. The computer program product of claim 37, wherein the computer program logic further comprises enabling a processor to detect an decrease in SNR.
43. The computer program product of claim 37, wherein the computer program logic further comprises enabling a processor to detect failed attempts of on line recovery (OLR).
44. The computer program product of claim 37, wherein the computer program logic further comprises enabling a processor to determine that the second modem is not responding to requests.
45. A computer program product comprising a non-transitory computer usable medium having computer program logic recorded thereon for enabling a first modem to reconfigure, the computer program logic:
enabling a processor to receive a signal of a transition of a second modem from a first showtime to fast reconfiguration;
enabling a processor to acknowledge receipt of the signal, wherein the acknowledging comprises sending at least one discrete multitone (DMT) symbol, wherein an alignment of the at least one sent DMT symbol is maintained from the first showtime;
enabling a processor to transition the first modem out of the first showtime;
enabling a processor to estimate a signal to noise ratio (SNR); and
enabling a processor to exchange parameters with the second modem.
46. The computer program product of claim 45, wherein the computer program logic further comprises:
enabling a processor to transition the first modem into a second showtime.
47. The computer program product of claim 45, wherein the estimating comprises sending at least one DMT symbol, wherein the alignment of the at least one sent DMT symbol is maintained from the first showtime.
48. The computer program product of claim 45, wherein the exchanging comprises sending at least one DMT symbol, wherein the alignment of the at least one sent DMT symbol is maintained from the first showtime.

* * * * *

UNITED STATES PATENT AND TRADEMARK OFFICE
CERTIFICATE OF CORRECTION

| | | |
|---|---|---|
| PATENT NO. | : 8,031,760 B2 | Page 1 of 1 |
| APPLICATION NO. | : 12/050461 | |
| DATED | : October 4, 2011 | |
| INVENTOR(S) | : Peeters et al. | |

It is certified that error appears in the above-identified patent and that said Letters Patent is hereby corrected as shown below:

Column 12, line 27, please replace "an decrease" with —a decrease—.

Column 13, line 10, please replace "an R-PMD message" with —a R-PMD message—.

Column 13, line 51, please replace "an R-PMD message" with —a R-PMD message—.

Column 14, line 26, please replace "an decrease" with —a decrease—.

Signed and Sealed this
Eighth Day of May, 2012

David J. Kappos
*Director of the United States Patent and Trademark Office*